United States Patent Office 3,531,933
Patented Oct. 6, 1970

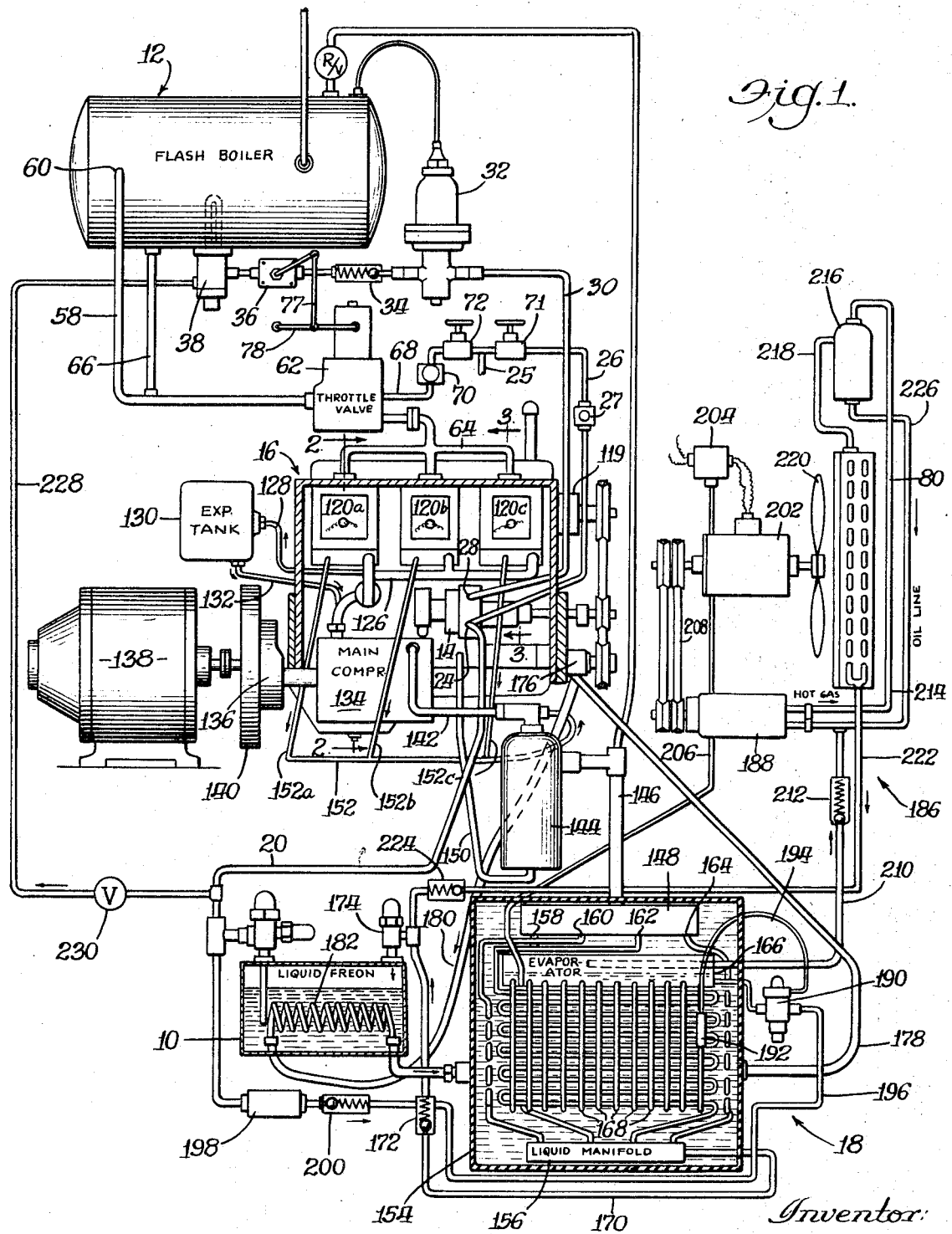

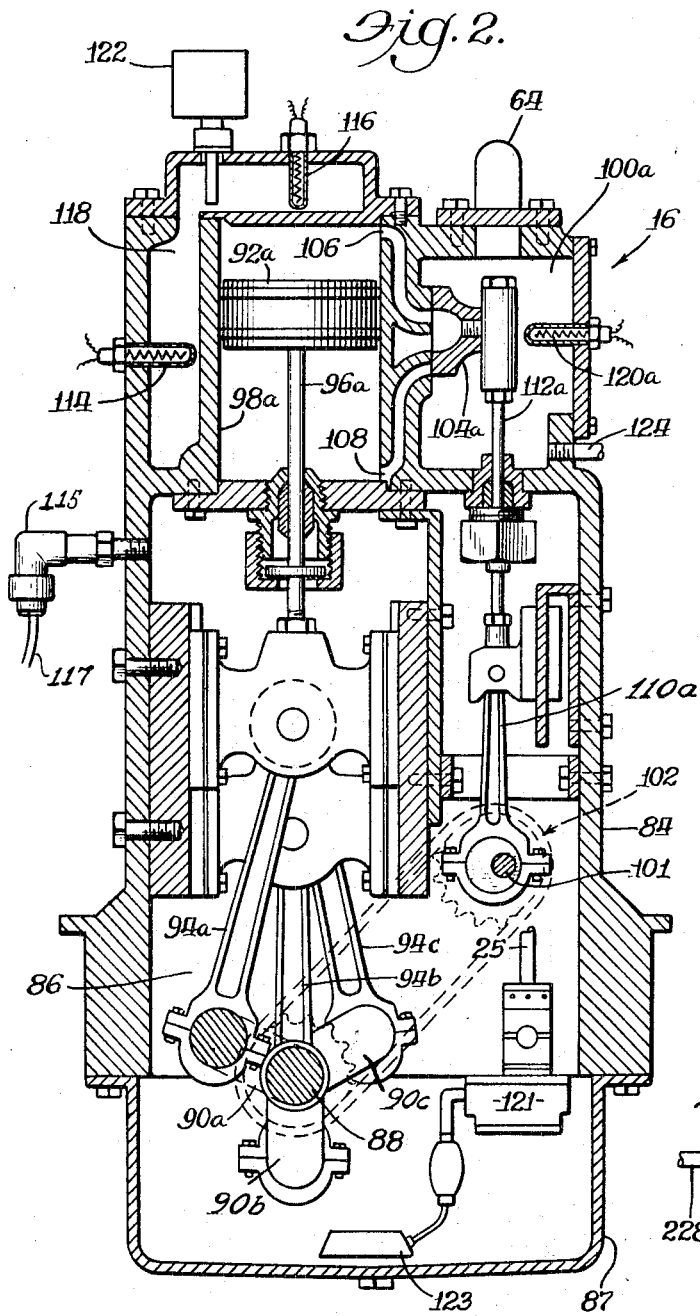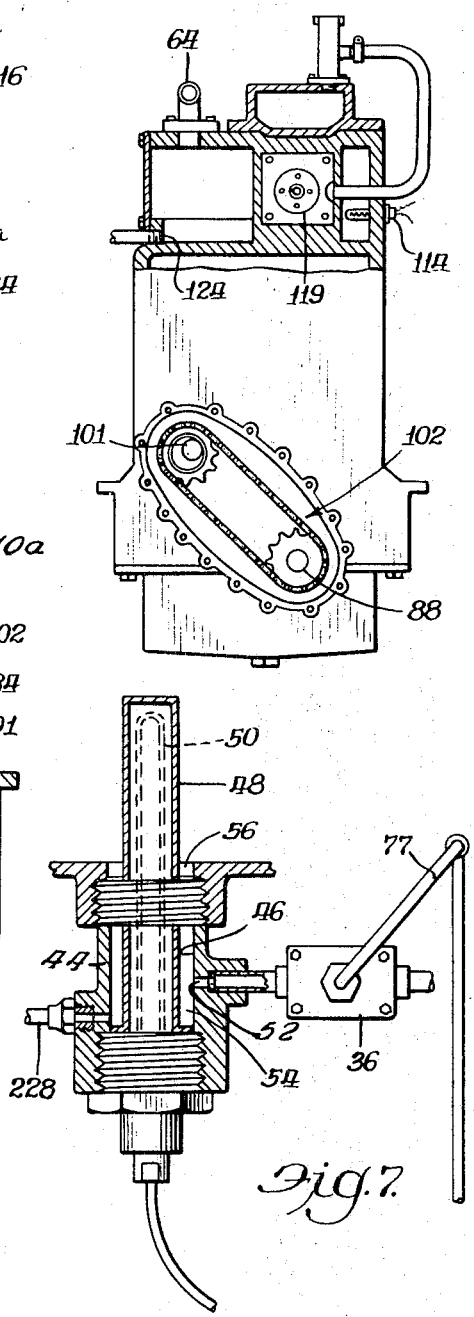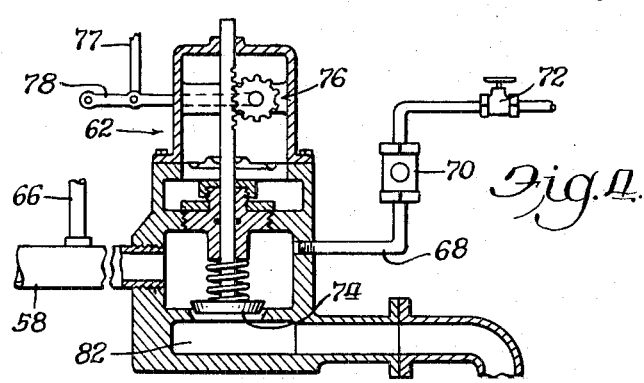

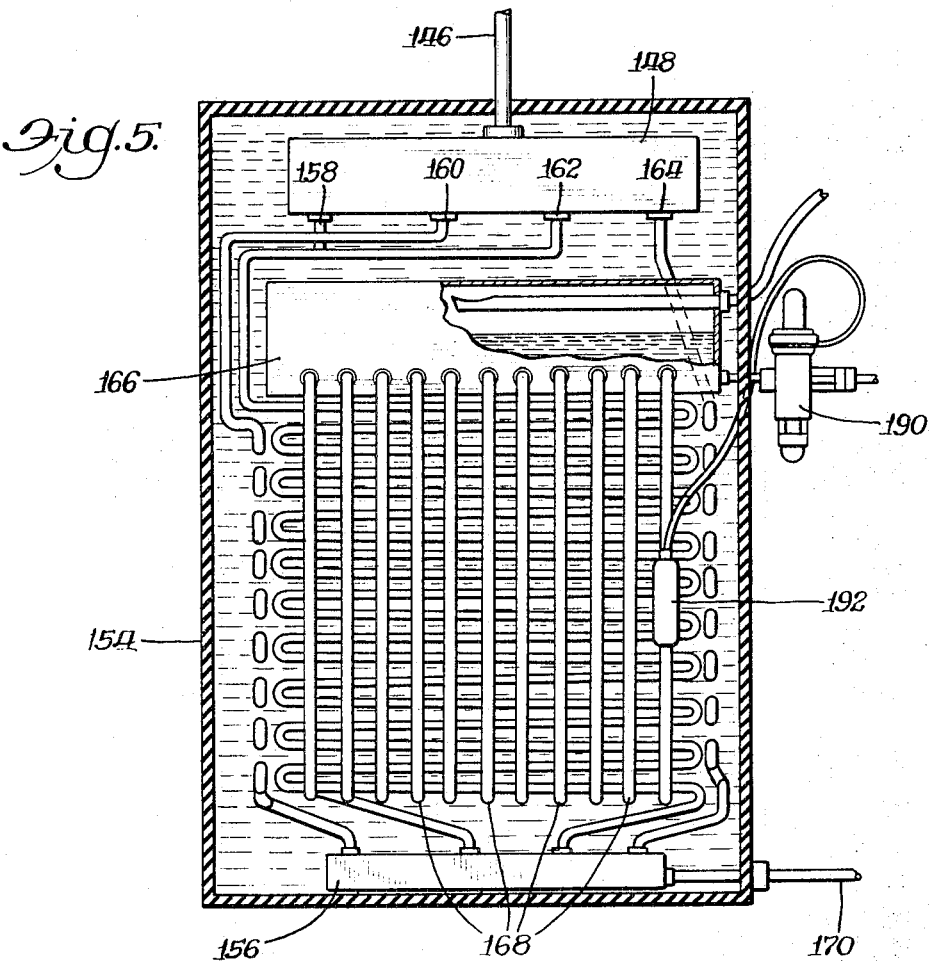
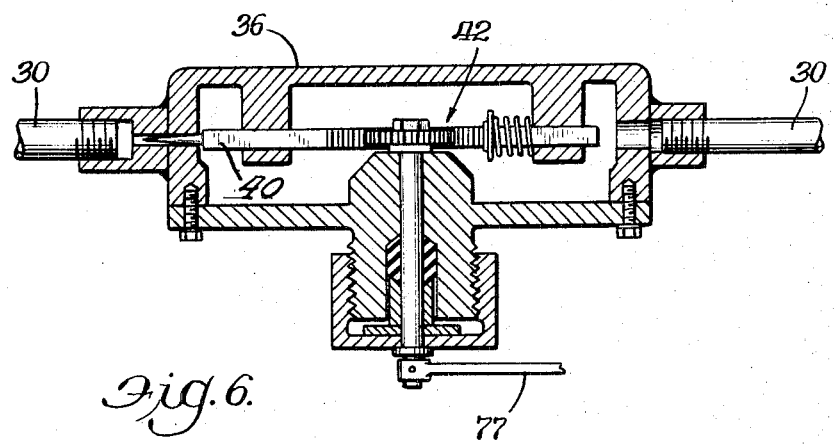

3,531,933
ISOTHERMAL EXPANSION CLOSED CIRCUIT POWER UNIT, USING REFRIGERANT SUPERHEATED GAS AS THE PRIME MOVER
Oscar Conrad Baldwin, 2223 S. 10th St., Burlington, Iowa 52601
Continuation-in-part of application Ser. No. 657,476, July 28, 1967. This application July 1, 1968, Ser. No. 741,383
Int. Cl. F01k 25/00
U.S. Cl. 60—36        16 Claims

ABSTRACT OF THE DISCLOSURE

A closed circuit power unit using Freon as a prime mover and including a three cylinder double acting piston type reciprocating engine wherein expanding Freon gas drives the engine and including means for condensing the expanded gas so that it may be reused in a continuous cycle. The condenser is refrigerated to further help in lowering the temperature in the Freon receiver. The Freon carries oil in suspension to lubricate the pump which carries liquid Freon to the flash boiler making it possible to pump Freon against higher back pressures than would otherwise be possible.

---

This invention relates to a system for producing motive power using Freon as the prime mover in a closed circuit.

This application is a continuation-in-part of my copending application Ser. No. 657,476, filed July 28, 1967, and now abandoned.

Summarizing the invention briefly I provide an energy converting system utilizing superheated Freon gas. This arrangement contemplates a closed circuit wherein the energy conversion resulting from the expansion of Freon gas is used to drive an engine, preferably a piston type reciprocating engine. The exhaust Freon gas is then compressed and condensed and returned to the Freon receiver for reuse in the system. The condensing system is refrigerated by a separate circuit utilizing a flooded type evaporator and air cooled condenser in order to accomplish maximum removal of excess heat which has been supplied to the system to superheat Freon and maintain substantially constant temperature conditions during conversion of heat energy. In addition, oil is mixed into the system to be carried in suspension by the Freon to facilitate pumping the Freon against the back pressure of the flash boiler.

One of the principal uses contemplated for a system utilizing the herein disclosed teachings is the automobile. In this modern day the problems of air pollution as a result of the byproducts of the automobile internal combustion engines are ever on the increase. The system disclosed herein could eliminate that problem insoar as automotive vehicles are concerned.

DESCRIPTION OF THE DRAWINGS

FIG. 1 shows the layout of a system embodying the principles of the invention;

FIG. 2 is a sectional view in elevation of the engine shown in FIG. 1 taken along the line 2—2 of FIG. 1;

FIG. 3 is a view in elevation partially in section taken along the line 3—3 of FIG. 1;

FIG. 4 is a sectional view in elevation of the throttle valve;

FIG. 5 is an enlarged view in elevation of the ethylene glycol bath in which both the condenser and evaporator are immersed;

FIG. 6 is an elevation view in section of a metering valve for controlling the amount of Freon that goes to the flash boiler;

FIG. 7 is an elevation view in section of the main heating element associated with the flash boiler.

Referring now to the drawings, there is shown in FIG. 1 a system for utilizing the features of my invention. The system comprises in general a refrigerant receiver 10, a flash boiler 12, a pump 14 for conveying liquid pressurized refrigerant to the flash boiler, an engine 16 to be operated by the expansion of the refrigerant and a condensing system 18 for converting the exhaust gas refrigerant back to a pressurized liquid and returning it to the receiver 10.

It is contemplated that the refrigerant to be used will be Freon and preferably a type known as Freon-12 having the chemical formulation of $CCl_2F_2$. The Freon reservoir or receiver 10 has a coolant circulating coil disposed therein through which coolant from the condensing system is circulated as will be hereinafter more fully described.

The pump 14 is driven by the engine 16 by suitable means such as a belt and pulley drive. The pump 14 takes a suction from the receiver 10 via conduit 20 connecting the receiver 10 to pump inlet 24. The pump 14 must be suitable to pump pressurized liquid Freon such, for example, as a gear or vane type pump but preferably of the internal gear type. Difficulties are often encountered with pumps in pumping liquid Freon because the Freon has a very low viscosity. This makes it difficult to pump Freon against any substantial back pressure. Much higher pumping pressures can be obtained if the pump gears or vanes are well lubricated. Thus, in order to overcome this difficulty, I provide for incorporating into the system an appropriate oil which will be carried in suspension by the Freon. This is a very important feature of the system. Since some Freon refrigerants are miscible with oil and some are only slightly miscible with oil or not at all, the choice of the right kind of Freon for this system is very important. For this reason Freon-12 being miscible with oil is particularly appropriate for this system. Freon-12 also is desirable because it is non-toxic, non-corrosive, non-irritating and non-flammable. The choice of oil to be used also is important and preferably should be of a type used in most air conditioning or refrigerator systems, probably having a viscosity of about 400 SU. The oil should be highly refined, with acids, moisture and other impurities removed. Mixing the oil with the Freon is a very important feature of this system since it permits pumping of the Freon against high pressures which would not be possible otherwise. A branch conduit 26 in communication with conduit 25 from the engine crankcase supplies oil to the inlet 24 of pump 14 to provide the necessary lubrication of the pump to obtain the required pump discharge pressure. A sight feed glass 27 is provided in the conduit 26 to the pump. The pump 14 preferably is provided with a recirculating line leading back to its inlet and controlled by a pressure-relief valve (not shown) which permits recirculation when the discharge pressure reaches a predetermined maximum.

The discharge of pump 14 through its outlet 28 flows into conduit 30 through a pressure controlled valve 32, a one-way check valve 34, a metering valve 36 and a main heating element 38 into flash boiler 12. The valve 32 operates in response to pressure in the flash boiler 12, being normally open, and closing when the pressure in the flash boiler reaches a predetermined maximum. The valve 32 may be a suitable pressure responsive Sylphon type valve or other suitable type valve such, for example, as a solenoid operated valve controlled by a switch responsive to the pressure in the flash boiler. The check valve 34 prevents flow from the flash boiler back in the direction of the pump. The metering valve 36 controls the rate of admission of liquid Freon to the flash boiler and is arranged to be operated in conjunction with and simultaneously with the engine throttle valve. The metering valve 36 may comprise a needle valve 40 mounted for reciprocating movement controlled by a rack and pinion arrangement 42. Once the liquid Freon is discharged from the metering valve it enters the main heating element 38 which is mounted on and projects into the flash boiler 12.

The main heating element 38 functions to heat the incoming Freon and superheat the vapor in the flash boiler 12. It comprises a housing or body 44 adapted to be connected into the flash boiler 12 by suitable means. The body 44 has a bore 46 formed therein in which is positioned a tubular portion 48 housing an electrically operated heating element 50. The tubular heating element extends up into the flash boiler. The body 44 also has an inlet 52 which takes the discharge from the metering valve 36 and connects with a chamber 54 defined by the bore 46 and tubular portion 48. An outlet 56 from the main heating element body discharges into the flash boiler. When liquid pressurized Freon is discharged from the metering valve 36 into the chamber 54 of the main heating element 38 contact with the heating element causes the liquid to expand into vapor. It is contemplated that the heating element 38 will be automatically controlled to hold the temperature in the flash boiler at approximately 120° to obtain a working pressure of about 150 p.s.i. gauge. At this temperature and pressure the heat content of the superheated vapor is about 88 B.t.u./lb.

A conduit 58 is connected to outlet 60 of the flash boiler and communicates with a throttle valve 62 which controls admission of Freon gas to the intake manifold 64 of the engine 16 and then into the heated valve chests and into the respective cylinders of the engine. A conduit 66 is connected to the bottom of the flash boiler to carry excess oil which settles out in the boiler, into the conduit 58 leading to the throttle. An oil conduit 68 branching from conduit 25 carries lubricating oil under pressure to the throttle valve 62 from the crankcase. A sight feed glass 70 and oil regulating valve 72 are provided in conduit 68.

One embodiment of a throttle valve 62 which may be used is shown in FIG. 4. It comprises a normally closed spring biased valve 74 which may be opened through gearing here shown as a rack and pinion arrangement 76 manually operable by level means 78 interconnected with metering valve 36 through an appropriate linkage 77 to operate the latter at the same time the throttle valve 62 is manipulated. The valve 74 controls admission of gaseous Freon from its inlet 80 to its outlet 82 and the intake manifold 64.

One of the important features insofar as the engine used in this system is concerned is the requirement of a continuity of power. For a small engine this can be accomplished with a three cylinder arrangement, and although my invention is not to be so limited I have chosen to use a three cylinder, double acting, piston, reciprocating type engine. The engine utilizes slide valves controlled by a plurality of eccentries mounted on an eccentric shaft for controlling the admission of superheated Freon to the engine cylinders, from the valve chests. The engine must be kept gas tight. The three cylinder engine comprises a cylinder block 84 having a crankcase 86 in the lower portion thereof and a crankcase sump 87 associated therewith. A crankshaft 88 is journalled in the engine cylinder block being provided with appropriate sealing means such as Sylphon or neoprene seals to keep the engine gas tight. The crankshaft 88 includes three crank arms 90a, 90b and 90c equally spaced at 120° and connected respectively to pistons 92a and (92b and 92c not shown) through connecting rods 94a, 94b and 94c and piston rods 96a and (96b and 96c not shown) to actuate the pistons in their respective cylinders 98a and (98b and 98c not shown). Valve chests 100a, and (100b and 100c, not shown) are associated with the respective cylinders and receive the gaseous Freon from the manifold 64. An eccentric shaft 101 is also journalled in the engine cylinder block and is drivingly connected to the crank shaft by suitable means such as a sprocket and timing chain arrangement 102. The eccentric shaft is operatively connected to a plurality of slide valves 104a and (104b and 104c, not shown) associated with their respective cylinders to control admission to and exhaustion of superheated Freon gas from the cylinders through port openings 106 and 108 associated with each cylinder. Eccentric connecting rods 110a and (110b and 110c, not shown) are connected respectively to valve connecting rods 112a and (112b and 112c, not shown) of the slide valves by suitable means to actuate the slide valves in a timed relationship with the crakshaft.

Heating elements are provided at various locations in the engine such as 114 and 116 in the water jacket 118 surrounding the engine cylinders and 120a, 120b and 120c in the valve chests associated with the respective cylinders. An adjustable temperature control switch 122 may be associated with the water jacket heating elements to vary the temperature of the water as needed.

A high pressure oil pump 121 is associated with the engine taking a suction from the crankcase sump 87 through strainer 123 and discharging through conduit 25. This feeds oil to the pump 14 via conduit 26 and valve 71, and to the throttle valve 62 via valve 72 and conduit 68. It is contemplated that the oil pressure in the system should be at least slightly higher than the maximum pressure which is expected to exist in the flash boiler 12. This would be necessary to get the oil into the throttle 62. On the basis that the maximum pressure in the boiler is expected to be about 150 p.s.i. the oil pressure in the system should be at least 155 p.s.i. The oil pump 121 also will be available as the source to provide adequate lubrication for the engine pistons, slide valves and guides and other parts of the engine. The engine will, of course, include adequate oil passage to lubricate all necessary parts. A water circulating pump 119 circulates water or other coolant in the water jacket 118. A crankcase relief valve 115 may be provided to bleed off excess gas pressure in the crankcase. Since this gas will contain oil a conduit 117 may be provided to carry the oil laden gas to an oil separator 144 via collector conduit 152.

Outlet means such as 124 are provided for conducting the expended exhaust Freon gas from each of the valve chests to an exhaust manifold 126 and thence through conduit 128 to an expansion tank 130 and then via conduit 132 to a main compressor 134. The expansion tank 130 serves as a breather to absorb the rapid exhaust pulses from the valve chests.

The expansion of the gas in the engine to operate the pistons thereof is an adiabatic expansion. Theoretically, there is no loss of heat if the engine is appropriately insulated. The heat energy is here converted to useful work, i.e., driving the engine. With this loss of heat energy, a pressure drop will occur during expansion of the gas, but the temperature of the gas will be maintained substantially constant, for example, at about 120° by the heat control process associated with the system. For example, the controls associated with the boiler, water jacket and valve chest heating elements will be effective to maintain a substantially constant temperature.

The main compressor 134 preferably is a rotary compressor in order to maintain a steady pull on the exhaust gases, and it preferably should have a capacity substantially larger than is necessary. The compressor 134 may be driven from the engine 16 by suitable means such as a belt and pulley drive 136. Adequate lubrication must also be provided.

The high direct current generator 138 is driven by the engine 16 and may be driven directly from the crankshaft 88 thereof with a flywheel 140 connected in the usual manner between the engine and the generator. It is contemplated that the generator will be of sufficient capacity to furnish the power necessary to drive an electrically driven automobile.

As the exhaust Freon gas is compressed by compressor 134 no heat is lost from the gas and, therefore, its temperature rises. The compressor 134 pushes the heated compressed gas through a conduit 142, through an oil separator 144, conduit 146, and into an intake manifold 148 of the condensing system 18. It is necessary to remove as nearly as possible all of the oil mixed with the Freon so that the oil will not accumulate on the condenser tubes and reduce the heat transfer capability of the condenser tubes. An oil conduit 150 carries the separated oil from the separator 144 back to the engine crankcase 86. Excessive oil from the engine valve chests may also be directed to the separator 144 via collector conduit 152 and its branch conduits 152a, 152b and 152c.

The condensing system 18 comprises an insulated tank 154 which contains a coolant preferably ethylene glycol. Immersed in the tank of ethylene glycol are the manifold 148, a liquid manifold 156, a plurality of coils 158, 160, 162 and 164 extending between and conecting the manifolds 148 and 156 and thus surrounded by the ethylene glycol. Also immersed in the tank of ethylene glycol is an evaporator 166, preferably of the flooded type, which will be described in greater detail. A plurality of coils 168 are associated with the evaporator 166 and are also submerged in the ethylene glycol bath. When the compressed exhaust Freon gas hits the cold manifold 148 it immediately begins to condense and then passes through the associated coils to further condense into a liquid form giving up its heat to the ethylene glycol. It eventually passes into the manifold 156 and through conduit 170 past a check valve 172, through valve 174 and into the liquid Freon receiver 10. The ethylene glycol in turn is refrigerated, giving up its heat to the evaporator coils 168 to evaporate liquid Freon in the evaporator. The ethylene glycol in the tank 154 is recirculated by a pump 176 which may be driven by engine 16. The pump 176 takes a suction via conduit 178 from the tank 154 and discharges via conduit 180 to a coil 182 disposed in the Freon receiver 10 and then back into tank 154 via conduit 184. Thus the ethylene glycol also extracts heat from the Freon in the receiver 10 thereby lowering the pressure therein and consequently the back pressure against which the compressors in the system must work to get the liquid Freon back into the receiver.

It is contemplated that the temperature of the Freon-12 in the receiver would be maintained at about 40° F. with a corresponding pressure of about 37 p.s.i. This relatively low pressure lowers the work load on the main compressor 134 thus using less of the engine horsepower output. The system design contemplates that about 75% of the receiver will be filled with liquid, the space above the liquid Freon being in the form of a saturated vapor.

The condensing system 18 also comprises a refrigerating section 186 which includes the evaporator 166, a compressor 188 and an air cooled condenser 189. The evaporator 166 is partially filled with liquid freon and is kept so filled by a thermostatically operated expansion valve 190. The valve 190 is normally closed and is arranged to open in response to a temperature sensor 192 connected to the valve 190 by a capillary tube 194. The sensor which may be attached to one of the evaporator coils 168 functions to sense the temperature of the freon in the evaporator. When the temperature rises to a predetermined point indicating that the volume of liquid freon in the evaporator 166 has dropped to a certain level, expansion valve 190 will open to admit freon from the receiver through conduit 196. A strainer 198 and check valve 200 are disposed in conduit 196, the check valve preventing flow back in the direction of the receiver 10. When the temperature in the evaporator rises as a result of heat being absorbed from the ethylene glycol, a motor 202 is turned on by the action of a capillary operated switch 204, a capillary tube 206 leading from the evaporator 166 to the switch 204. This starts the compressor 188 which may be driven from the motor 202 by suitable means such as a belt and pulley drive 208. The motor 202 is driven from a battery associated with the system. The compressor 188 then takes a suction of hot gas from the evaporator 166 through conduit 210 and check valve 212. The hot freon gas is compressed and discharged through conduit 214 to an oil separator 216 and then through conduit 218 to the air cooled condenser 189. The condenser is cooled by a fan unit 220 driven by motor 202. The compressor 188 preferably is of the rotary type to maintain a continuity of flow. The freon now condensed to a liquid in condenser 189 is forced back to the receiver 10 via conduit 222 check valve 224 and valve 174. An oil conduit 226 carries off the separated oil from the separator 216 back to the inlet of compressor 188 and functions as a lubricant for the latter. The refrigerating section 186 is a very important feature of this whole system. The heat that is supplied to the system by the heating elements throughout somehow must be removed, and the refrigeration of the condensing system accomplishes this. The main feature of this refrigerated condensing system is to achieve a very low temperature so that a low pressure can be maintained in the receiver 10 and a low back pressure on the compressor. The lower the receiver pressure the less the work load on the compressors to move the liquid freon back to the receiver. Preferably the receiver temperature is held down to about 40° F. so that the pressure will be about 37 p.s.i.

To start the unit raw Freon is admitted to the main heater housing 44 via conduit 228 branching from conduit 20 by opening valve 230. The main heater unit 38 has previously been turned on by a switch on a control panel (not shown). Once the pressure rises to a predetermined point in the boiler, the valve 230 is closed and operation of the system will then proceed automatically. This starting operation probably would not have to be repeated after the boiler once has had a charge of Freon. After the engine operation has been shut off and been inoperative for a period of time, there should be sufficient Freon in the boiler for the system to start merely by turning on the heater unit 38.

The operation of the system would seem to be apparent from the preceding description, but it will now be briefly summarized. Liquid Freon drawn from the receiver 10 by the pump 14 is pressurized thereby. Oil introduced into the Freon system makes it possible to pump the Freon into the flash boiler against the back pressure of the latter. External heating means 38 is used to increase the temperature of Freon in the flash boiler and expanding it into a gas and superheating it. This superheated gas is then introduced via throttle valve 62 into the valve chests of the engine 16 where it is used to drive the engine which in turn drives the direct current generator 138 connected thereto. The exhaust Freon gas now having undergone an adiabatic expansion in the engine is exhausted to a main compressor 134 which pushes the compressed gas into manifold 148 of the refrigerated condensing system 18 and back to the cooled liquid receiver 10. The final heat dissipation is carried out by the air-cooled condensor 189 and its associated evaporator 166 and compressor 188.

It is contnemplated that in using this system on an automobile that a 24-volt battery system will be used to assure reliability. The electrical loads may at times be heavier than can be handled by a 12-volt battery. The engine, of course, would be equipped with a generator to be driven thereby for purpose of recharging the batteries in accordance with standard practice.

It is very important that as much of this system as possible be well insulated, especially the Freon receiver, the flash boiler, the engine and its throttle, the compressor and the ethylene glycol tank.

I claim:
1. A power system comprising:
a reservoir for refrigerant;
means for vaporizing and superheating said refrigerant to produce superheated vapor, said means including a boiler and heating means associated with said boiler;
pump means for transferring pressurized liquid refrigerant to said boiler;
engine means for converting energy of the superheated vapor into motive power and then exhausting said vapor for reuse in the system;
condensing means for condensing the refrigerant;
means for cooling said condensing means;
first compresser means operatively connected to said engine means to take a suction therefrom and to said condensing means to discharge thereto, and wherein
said condensing means includes an insulated tank of coolant and condenser coils for taking the discharge from said compressor means for absorbing heat from the gas received from said compressor means, and
said refrigerating means includes an evaporator disposed in said tank of coolant to remove heat therefrom, said evaporator being of the flooded type and being operatively connected to said reservoir to be replenished therefrom, and condensing means for condensing the evaporated refrigerant and returning it to said reservoir.

2. The power system of claim 2 wherein:
the refrigerant is dichlorodifluoromethane and includes means for introducing oil into the system to be held in suspension by the refrigerant to lubricate said pump means to help develop the necessary pressure to transfer liquid refrigerant to said boiler.

3. A power system comprising:
a reservoir for refrigerant;
means for vaporizing and superheating said refrigerant to produce superheated vapor, said means including a boiler and heating means associated with said boiler;
pump means for transferring pressurized liquid refrigerant to said boiler;
engine means for converting energy of the superheated vapor into motive power and then exhausting said vapor for reuse in the system;
condensing means for condensing the refrigerant;
means for cooling said condensing means;
compressor means operatively connected between said engine means to receive the exhaust vapor therefrom and said condensing means.

4. The power system of claim 3 including:
means for introducing oil into the system to be held in suspension by the refrigerant to lubricate said pump means to help develop the necessary pressure to transfer liquid refrigerant to said boiler.

5. The power system of claim 4 wherein:
the refrigerant used in the system is dischlorodifluoromethane.

6. The power system of claim 5 wherein:
said condensing means includes a tank of coolant for absorbing heat and coil means immersed in said coolant, said coil means being operatively connected to said compressor means to receive the discharge therefrom.

7. The power system of claim 6 wherein: the coolant used is ethylene glycol.

8. The power system of claim 6 including:
means for circulating said coolant through said reservoir to remove heat from the refrigerant therein.

9. The power system of claim 8 wherein:
said refrigerating means includes evaporating means disposed in said tank of coolant and an air cooled condenser, the discharge from the latter being connected to said reservoir.

10. The power system of claim 9 wherein: said evaporating means is a flooded type evaporator.

11. The power system of claim 6 including:
oil separator means for removing oil from the refrigerant before the refrigerant enters said condensing means.

12. The power system of claim 6 including:
electrical generator means operatively connected to said engine means to be driven thereby.

13. A power system comprising:
a reservoir for refrigerant;
means for vaporizing and superheating said refrigerant to produce superheated vapor, said means including a boiler and heating means associated with said boiler;
pump means for transferring pressurized liquid refrigerant to said boiler;
engine means for converting energy of the superheated vapor into motive power and then exhausting said vapor for reuse in the system, said engine means being a three cylinder, reciprocating piston engine;
condensing means for condensing the refrigerant;
means for cooling said condensing means; and
heating means associated with said engine means to maintain a predetermined temperature condition while the refrigerant gas is being expanded in the engine.

14. A power system comprising:
a reservoir for refrigerant;
means for vaporizing and superheating said refrigerant to produce superheated vapor, said means including a boiler and heating means associated with said boiler;
pump means for transferring pressurized liquid refrigerant vapor to said engine means;
engine means for converting energy of the superheated vapor into motive power and then exhausting said vapor for reuse in the system;
condensing means for condensing the refrigerant;
means for cooling said condensing means;
metering valve means for controlling the flow of refrigerant to said vaporizing means; and
throttle valve means for controlling the flow of refrigerant vapor to said engine means.
means interconnecting said metering valve means and said throttle valve means for simultaneous control of both.

15. A power system comprising:
a reservoir for refrigerant;
means for vaporizing and superheating said refrigerant to produce superheated vapor, said means including a boiler and heating means associated with said boiler;
pump means for transferring pressurized liquid refrigerant to said boiler;
engine means for converting energy of the superheated vapor into motive power and then exhausting said vapor for reuse in the system;
condensing means for condensing the refrigerant; and
means for refrigerating said condensing means which includes a flooded type evaporator connected to said reservoir to be replenished therefrom.

16. A power system comprising:
a reservoir for refrigerant;
means for vaporizing and superheating said refrigerant to produce superheated vapor, said means including a boiler and heating means associated with said boiler;
pump means for transferring pressurized liquid refrigerant to said boiler;
engine means for converting energy of the superheated vapor into motive power and then exhausting said vapor for reuse in the system;
condensing means for condensing the refrigerant, said condensing means including an insulated tank of coolant, and means for refrigerating said condensing means, said refrigerating means including an evaporator disposed in said tank of coolant to remove heat therefrom, said evaporator being of the flooded type and being operatively connected to said reservoir to be replenished therefrom, and condensing means for condensing the evaporated refrigerant and returning it to said reservoir.

References Cited

UNITED STATES PATENTS

| | | | |
|---|---|---|---|
| 2,301,404 | 11/1942 | Holmes | 60—36 |
| 2,305,162 | 12/1942 | Holmes | 60—36 X |
| 2,410,457 | 11/1946 | Nettel | 62—79 X |
| 3,021,689 | 2/1962 | Miller | 62—84 X |
| 3,124,696 | 3/1964 | Tucker | 60—36 X |
| 3,375,197 | 3/1968 | Spauschus | 62—84 X |

CARROLL B. DORITY, JR., Primary Examiner